(12) United States Patent
Yoakam et al.

(10) Patent No.: US 7,364,166 B2
(45) Date of Patent: Apr. 29, 2008

(54) SEAL AND RETAINER FOR A FLUID CONNECTION

(75) Inventors: John Arthur Yoakam, North Ridgeville, OH (US); Richard Alan Quayle, Sheffield Lake, OH (US); Dennis Floyd Quayle, Elyria, OH (US)

(73) Assignee: Applied Engineered Surfaces, Inc., Elyria, OH (US)

( * ) Notice: Subject to any disclaimer, the term of this patent is extended or adjusted under 35 U.S.C. 154(b) by 232 days.

(21) Appl. No.: 10/350,422

(22) Filed: Jan. 24, 2003

(65) Prior Publication Data

US 2004/0145124 A1    Jul. 29, 2004

(51) Int. Cl.
*F16L 19/00* (2006.01)

(52) U.S. Cl. .............. 277/616; 277/608; 277/609; 277/626; 277/637; 277/917; 285/379

(58) Field of Classification Search ............ 277/602, 277/608–609, 612–616, 626–627, 917, 606, 277/630, 637; 285/328, 379, 3–4, 917
See application file for complete search history.

(56) References Cited

U.S. PATENT DOCUMENTS

| | | | |
|---|---|---|---|
| 949,658 A | 2/1910 | Randall | |
| 1,133,320 A | 3/1915 | Rockwood | |
| 2,292,216 A | 8/1942 | Doran | 123/169 |
| 2,462,762 A | 2/1949 | Nardin | 288/27 |
| 2,619,357 A * | 11/1952 | Montgomery | 277/411 |
| 2,871,036 A | 1/1959 | Goodman | 285/354 |
| 3,080,171 A | 3/1963 | Booth | 277/112 |
| 3,262,722 A | 7/1966 | Gastineau et al. | 285/212 |
| 3,275,348 A | 9/1966 | Scott | 285/212 |
| 3,298,719 A | 1/1967 | Bills et al. | 285/336 |
| 3,521,910 A | 7/1970 | Callahan, Jr. et al. | 285/14 |
| 4,095,809 A * | 6/1978 | Smith | 277/609 |
| 4,522,536 A * | 6/1985 | Vidrine | 277/609 |
| 4,540,205 A | 9/1985 | Watanabe et al. | 285/329 |
| 4,552,389 A * | 11/1985 | Babuder et al. | 277/609 |
| 4,570,981 A | 2/1986 | Fournier et al. | 285/332.3 |
| 4,650,227 A * | 3/1987 | Babuder et al. | 277/609 |
| 4,838,583 A * | 6/1989 | Babuder et al. | 277/609 |
| 5,145,219 A * | 9/1992 | Babuder | 277/609 |
| 5,163,721 A * | 11/1992 | Babuder | 277/609 |
| 5,340,170 A * | 8/1994 | Shinohara et al. | 277/609 |
| 5,366,261 A * | 11/1994 | Ohmi et al. | 277/609 |

(Continued)

FOREIGN PATENT DOCUMENTS

CA    651733    11/1962

(Continued)

*Primary Examiner*—Patricia Engle
*Assistant Examiner*—Christopher Boswell
(74) *Attorney, Agent, or Firm*—Renner, Otto, Boisselle & Sklar

(57) ABSTRACT

A seal/retainer unit (10) comprising an annular sealing gasket (12) and a plurality of retaining legs (14) extending generally perpendicularly therefrom. The sealing gasket (12) and the retaining legs (14) are formed in one piece (e.g., stamped) from a sealing material and dimensioned to allow nesting of a plurality of seal/retainer units (10) in a stacked arrangement. The retaining legs (14) may each include a rounded distal edge (16) to minimize package-tearing and interpart-marking and/or a break-off notch (18) to allow special customization. A radiused corner (20) between the gasket (12) and the legs (14) assures a gap between nested parts.

54 Claims, 4 Drawing Sheets

U.S. PATENT DOCUMENTS

| | | | | |
|---|---|---|---|---|
| 5,409,270 A | * | 4/1995 | Shinohara et al. | 277/609 |
| 5,423,580 A | * | 6/1995 | Mohlenkamp et al. | 277/609 |
| 6,044,590 A | * | 4/2000 | Gagas | 277/608 |
| 6,318,766 B1 | * | 11/2001 | Babuder et al. | 277/609 |
| 6,367,803 B1 | * | 4/2002 | Loth | 277/321 |
| 6,581,941 B2 | * | 6/2003 | Carr | 277/609 |

FOREIGN PATENT DOCUMENTS

| | | |
|---|---|---|
| DE | 1775199 | 7/1971 |
| FR | 984093 | 7/1951 |
| FR | 1085339 | 1/1955 |
| GB | 2126301 A | 3/1984 |
| IT | 0609649 | 9/1960 |
| JP | 54-129812 | 10/1979 |

* cited by examiner

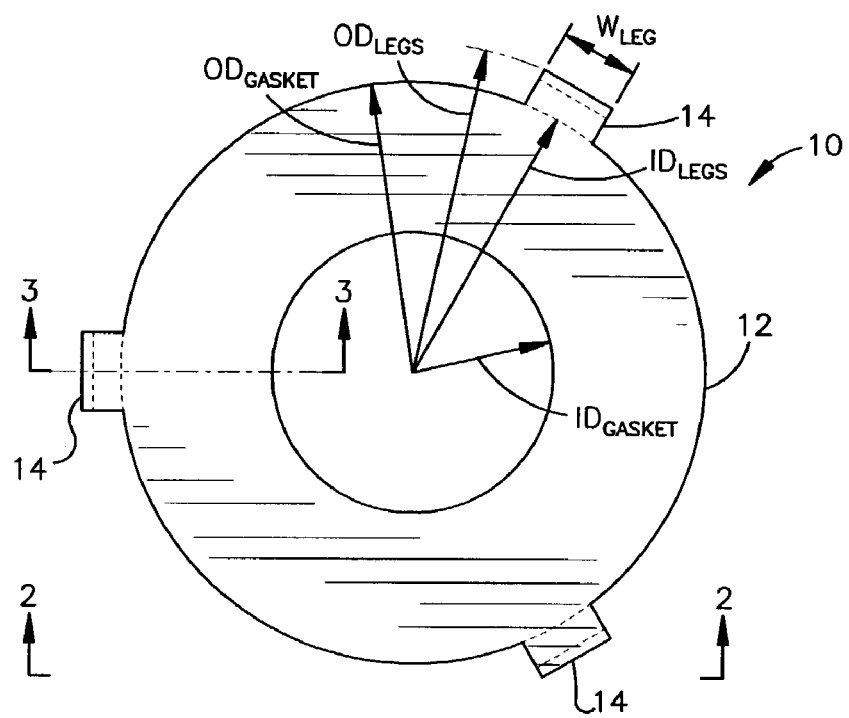
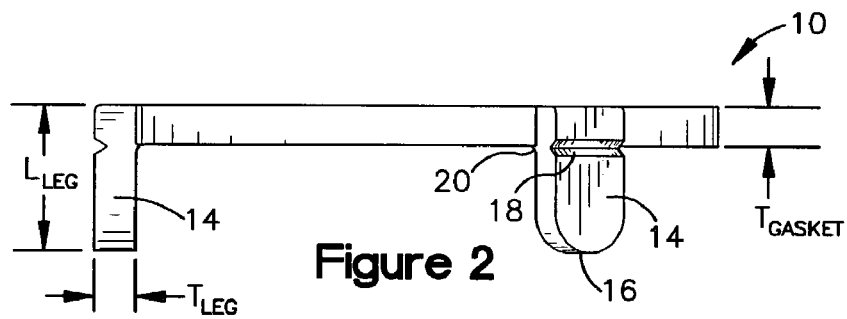
Figure 2
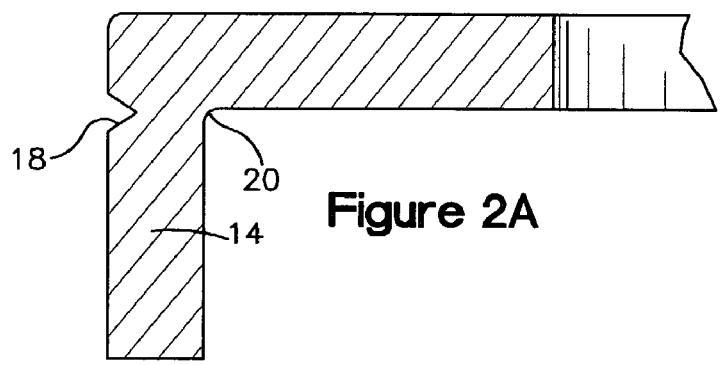
Figure 2A

SEAL AND RETAINER FOR A FLUID CONNECTION

FIELD OF THE INVENTION

This invention relates generally as indicated to a seal and retainer for a fluid connection and, more particularly, to a seal and retainer for a fluid connection comprising a first coupling component, a second coupling component, and a coupling nut which draws the coupling components together.

BACKGROUND OF THE INVENTION

A common fluid connection comprises a first coupling component, a second coupling component, and a coupling nut which draws the coupling components together. The inner faces of the first and second coupling components are disposed in an end-to-end relationship to provide a through-path between the respective passageways. A sealing bead extends axially outward from the inner face of the first coupling component and a similar sealing bead extends axially outward from the inner face of the second coupling component. A sealing gasket is interposed between the beads, and seals the union between the first and second coupling components.

An accurate positioning of the sealing gasket relative to the coupling components, and particularly to their beads, is important to assure proper sealing. To this end, a retainer is commonly used to hold the sealing gasket in the correct location during assembly of the fluid connection. One popular type of retainer comprises a plurality of legs, which are sized and shaped to bias fit upon a leg-receiving ledge of the first coupling component. A separate sealing gasket can be secured to the retainer or, alternatively, the sealing gasket and the retainer can be integrated into a one-piece unit (see e.g., U.S. Pat. No. 4,650,227). In either case, the sealing gasket and retainer can be attached to the first coupling component via placement of its legs on the leg-receiving ledge, and the second coupling component is then assembled to the first coupling component to complete the fluid connection.

In the past, different designs for sealing gaskets and retainers have been proposed, developed and/or commercialized, and most of these designs are believed to perform adequately with respect to sealing performance. However, the challenge currently facing the industry, is the production of satisfactorily performing parts in an economic, commercially viable manner. This challenge is complicated when a fluid connection is intended for use in semiconductor fabrication systems (wherein contamination is measured on a parts-per-billion basis) as the sealing gasket and retainer must be ultra-clean to satisfy the strict purity standards.

SUMMARY OF THE INVENTION

The present invention provides a seal/retainer unit which can be mass-produced in an economic, commercially viable manner. The seal/retainer unit is an integration of a sealing gasket and a retainer into a single one-part piece which can be stamped in an automatic stamping operation. A plurality of the seal/retainer units can be nested in a stacked arrangement and a gap can be provided between adjacent units to facilitate cleaning steps, especially pre-cleaning, annealing, and ultra-cleaning steps. The seal/retainer can be constructed to minimize package tearing and inter-part marking, and/or to allow selective removal of one or more of its retaining legs.

More particularly, the present invention provides a seal/retainer unit comprising an annular sealing gasket and one or more retaining legs extending generally perpendicularly therefrom. The sealing gasket and the retaining leg(s) are formed in one piece from a sealing material, such as sealing metal (e.g., nickel, steel, and copper). The seal/retainer unit can be made by stamping a blank, which comprises an annular portion and one or more leg portions extending radially outward from the annular portion, and then appropriately bending the leg portions. Thereafter, the bent parts are cleaned, annealed, polished and ultra-cleaned to complete the manufacturing process. Preferably, the stamping step comprises substantially simultaneously forming a plurality of blanks during an automatic stamping operation, and the bending step is preformed preferably during the same automatic operation.

The seal/retainer has an inner diameter $ID_{legs}$ formed by the radially innermost portions of the retaining legs, and this dimension is not less than the outer diameter $OD_{gasket}$ of the gasket. In this manner, a plurality of the seal/retainer units can be nested in a stacked arrangement. The intersection between the bottom surface of the sealing gasket and the radially inner surface of the leg(s) is a rounded corner (formed during the bending step), which assures a gap G between adjacent seal/retainer units in the nested stack. This gap G allows an efficient and thorough pre-annealing cleaning of the parts, which is essential for subsequent polishing and ultra-cleaning in certain (e.g., semiconductor-related) circumstances.

Each retaining leg is provided preferably with a rounded (i.e., no sharp angles) distal edge. The rounded distal edge helps to prevent the seal/retainer from causing damage to the packaging (e.g. tearing of a plastic bag) used during storage, transportation, and distribution. This "non-sharp" edge may also minimize the marking typically caused when one gasket/retainer comes into contact with another gasket/retainer prior to installation.

One, some, or all of the retaining legs can be provided with a break-off notch extending across its width and axially aligned at or above the bottom surface of the sealing gasket. In this manner, a selected number of retaining legs can be removed so that the seal/retainer can be customized to accommodate "zero-clearance" installation and even legless applications. The break-off notch can be conveniently formed during the stamping step, whereby this feature of the invention does not add any additional manufacturing steps.

These and other features of the invention are fully described and particularly pointed out in the claims. The following description and annexed drawings set forth in detail a certain illustrative embodiment of the invention, this embodiment being indicative of but one of the various ways in which the principles of the invention may be employed.

DRAWINGS

FIG. 1 is a top plan view of a seal/retainer unit according to the present invention, the unit being an integration of a sealing gasket and gasket-retaining means into a single one-piece part.

FIG. 2 is side view of the seal/retainer unit.

FIG. 2A is an enlarged portion of FIG. 2 showing a radiused corner of the seal/retainer unit.

DETAILED DESCRIPTION

Figure 3:
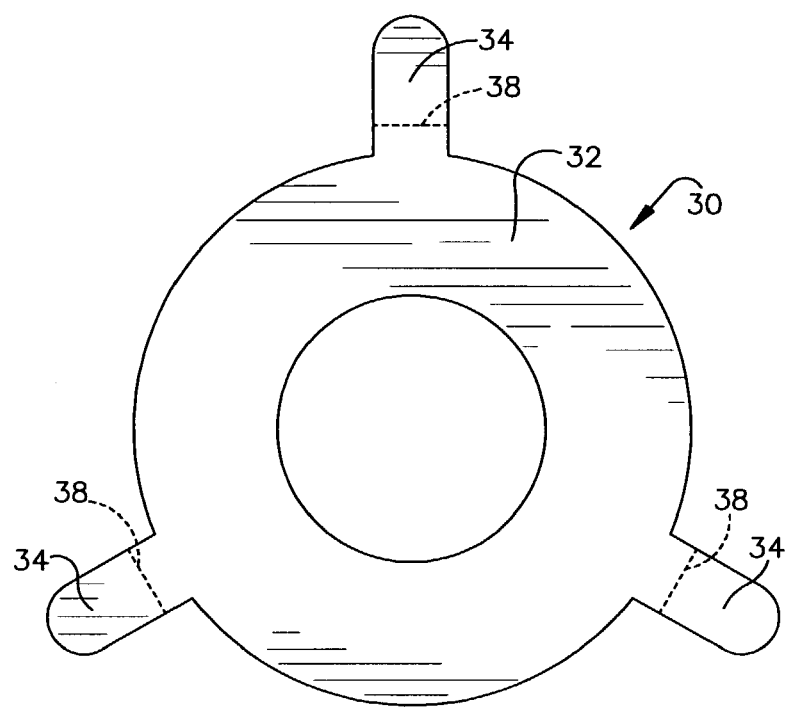
FIG. 3 is top plan view of a blank that can be formed into the seal/retaining unit.

Referring now to the drawings in detail, and initially to FIGS. 1 and 2, an integrated seal/retainer 10 according to the present invention is shown. The seal/retainer 10 comprises a gasket 12 and one or more retaining legs 14 extending therefrom. The seal/retainer 10 can be made of a sealing material and, more particularly, a sealing metal such as nickel, steel, or copper (e.g., Nickel 201, 316L Stainless Steel, 316L Silver Plated Stainless Steel, and copper). The seal/retainer unit 10 is an integration of a sealing gasket and gasket-retaining legs into a single one-piece part.

The gasket 12 has an annular shape with an inner diameter $ID_{gasket}$, an outer diameter $OD_{gasket}$, and a thickness $T_{gasket}$. Each retaining leg 14 has a roughly rectangular shape with a length $L_{leg}$, a width $W_{leg}$, and a thickness $T_{leg}$. Also, the outer surfaces of the retaining legs 14 together define an outer diameter $OD_{legs}$ and the inner surfaces of the retaining legs 14 define an inner diameter $ID_{legs}$. Significantly, the inner diameter $ID_{legs}$ is not less than (i.e., greater than or equal to) the outer diameter $OD_{gasket}$ of the sealing gasket 12. Preferably, the gasket thickness $T_{gasket}$ is approximately equal to the leg thickness $T_{leg}$, and the gasket's outer diameter $OD_{gasket}$ is approximately equal to the retaining legs' outer diameter $OD_{legs}$ less twice the leg thickness $T_{leg}$.

In the illustrated embodiment, the seal/retainer 10 has three retaining legs 14 uniformly arranged 120° apart around the circumference of the annular sealing gasket 12. However, more (e.g., four, five, six, etc) or less (e.g., two, one) retaining legs, and/or non-uniform arrangements, are possible with and contemplated by the present invention. In fact, as explained in more detail below, the retaining legs 14 can be designed to allow selective removal of the protruding portions of one or more retaining legs 14 to accommodate "zero-clearance" installation and even legless applications.

The retaining legs 14 each extend axially outward from the radially outer surface of the annular sealing gasket 12. Preferably, the retaining legs 14 extend perpendicularly from the gasket 12, whereby the outer side of each retaining leg 14 is positioned approximately parallel to the radially outer surface of the annular sealing gasket 12. The top surface of each retaining leg 14 preferably is flush with the top surface of the annular sealing gasket 12 and extends outward from its outer diameter $OD_{gasket}$.

Each retaining leg 14 preferably is provided with a rounded (i.e., no sharp angles) distal edge 16, a break-off notch 18, and a radiused corner 20 (see FIG. 2A) between the bottom axial surface of the gasket 12 and the radially inner surface of the retaining leg 14. The rounded distal edge 16 helps prevent the seal/retainer 10 from causing damage to the packaging (e.g. tearing of a plastic bag) used during storage, transportation, and distribution. This "non-sharp" edge 16 may also minimize the marking typically caused when one gasket/retainer comes into contact with another gasket/retainer prior to installation.

Referring now to FIG. 3, a blank 30 formed from a flat sheet of sealing material (having a thickness equal to the desired thickness $T_{gasket}$ of the annular sealing gasket 12 and/or the desired thickness $T_{leg}$ of the retaining legs 14) is shown. The blank 30 comprises an annular portion 32, having dimensions corresponding to the desired shape of the annular sealing gasket 12, and leg portions 34 extending radially outward therefrom. The leg portions 34 are positioned relative to each other about the circumference of the annular portion 32 in a manner corresponding to the desired spacing (e.g., 120°) of the retaining legs 14, and each has dimensions/geometry corresponding thereto. A break-off line 38, corresponding to the intended location/orientation of the break-off notch 18, can be formed on the leg portions 34 simultaneously during the stamping process.

After formation of the blank 30, the leg portions 34 are bent downward to form the seal/retainer 10. This bending results in a rounded (rather than angled) intersection between the annular portion 32 and the leg portions 34, thereby forming the angled corner 18. Thereafter, the unit can be cleaned to remove lubrication and/or accumulated debris, annealed, polished, ultra-cleaned, and packaged.

Preferably, a plurality of blanks 30 are formed simultaneously during automatic stamping/bending operations. In this manner, the seal/retainer units 10 can be mass-produced in a very economic manner. No further assembly is required to complete the construction of the retainer/seal 10, thereby providing a very "clean" component from a manufacturing point of view. Specifically, for example, there are no separate parts to assemble, thereby reducing manufacturing steps/time and eliminating any rubbing between separate parts during such assembly.

Figure 4:
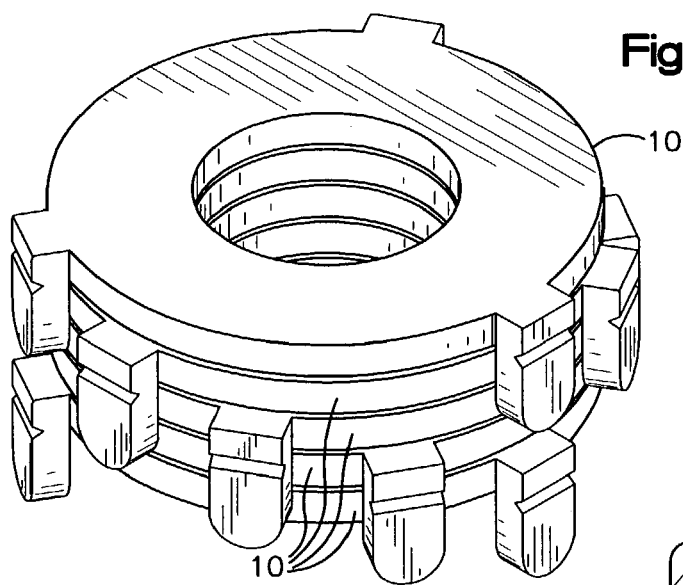
FIG. 4 is a perspective view of a plurality of the seal/retainer units compiled in a nested arrangement.

Referring now to FIG. 4, a plurality of the seal/retainers 10 are shown nested together. Such nesting is possible with the present invention because, except for the radiused corner 20, the retaining legs 14 do not extend into the area defined by the outer diameter $OD_{gasket}$ of the annular sealing gasket 12. In this manner, the retaining legs 14 of an upper seal/retainer 10 may overlap the annular sealing gasket 12 of a lower seal/retainer 10 when the retaining legs 14 of the respective adjacent seal/retainer 10 are angularly offset. The ability to nest the seal/retainers 10 facilitates subsequent manufacturing processes (e.g., cleaning, annealing, etc.) and pre/post manufacture storage and handling.

Figure 4A:
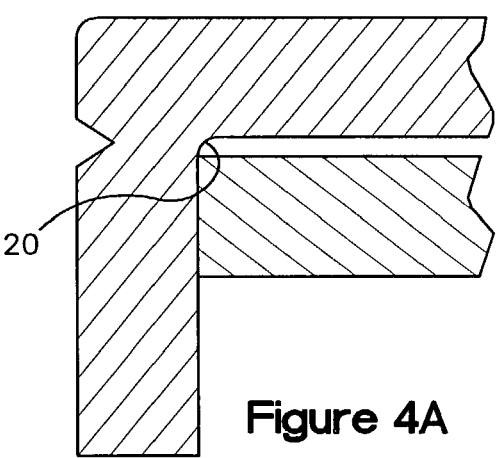
FIG. 4A is an enlarged portion of FIG. 4 showing a clearance gap between adjacent nested parts.

As is best seen in FIG. 4A, the radiused corner 20 assures a gap G between nested parts. The gap G can be in the range of 0.010" and 0.020" or greater/less, depending upon the particular situation. The ability to compile a plurality of the seal/retainer units 10 in a nested stack, and the ability to provide the gap G between respective units 10, allows a commercially viable "super-cleaning" of the parts prior to annealing steps. In this manner, the seal/retainers 10 are suitable for use in ultra high purity gas delivery applications, such as used in semiconductor fabrication systems wherein contamination is controlled on a parts-per-billion scale.

Additionally, or alternatively, the gap G eliminates direct contact between the upper surface of a seal/retainer's annular sealing gasket 12 and the lower surface of the annular sealing gasket 12 of the seal/retainer 10 positioned on top thereof. This can significantly reduce "marking" of parts, even when the above-described stamping technique is used to produce the parts. In this regard, it is noted that stamping often results in rough spots (or burrs) on the bottom of the stamped part and particularly on the inner diameter $ID_{gasket}$ of the annular sealing gasket 12. If this edge of the annular sealing gasket 12 is to contact another part directly, an additional polishing step may be necessary to remove marks on the contacted part. The gap G minimizes direct contact when the seal/retainers 10 are stacked, thereby eliminating the need for a special polishing step for mark-removing purposes.

Figure 5:
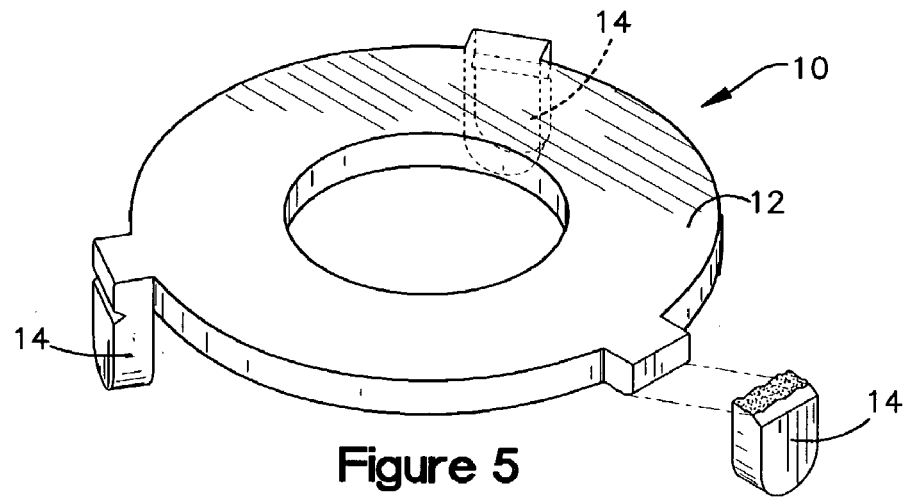
FIG. 5 is a perspective view of the seal/retainer unit with one of its retaining legs removed.
Figure 6:
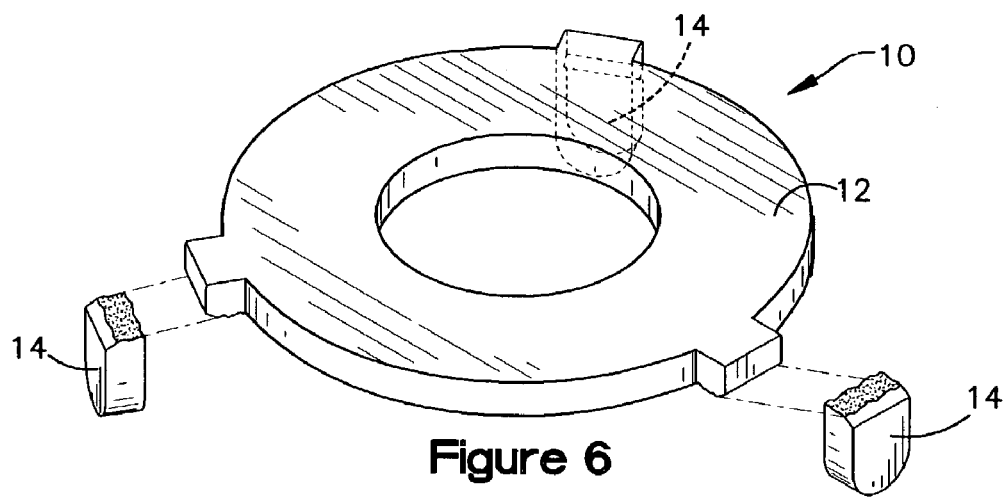
FIG. 6 is a perspective view of the seal/retainer unit with some of its retaining legs removed.
Figure 7:
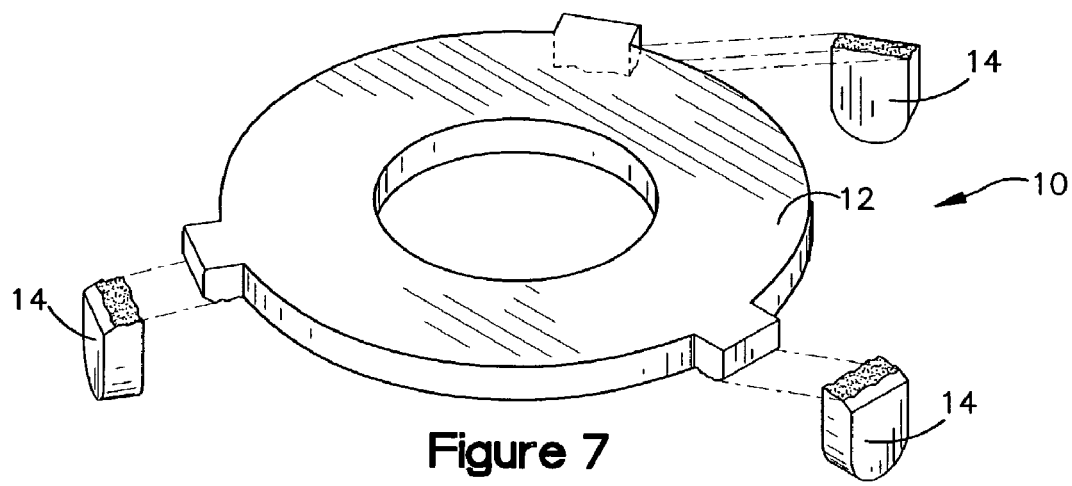
FIG. 7 is a perspective view of the seal/retainer unit with all of its retaining legs removed.

Referring now to FIGS. 5-7, the customization of the seal/retainer unit 10 for certain sealing situations is schematically shown. As indicated above, each retaining leg 14 has a break-off notch 18 and, as shown in the drawings, this notch 18 extends across the leg's width $W_{leg}$ and is axially aligned with the bottom surface of the annular sealing gasket 12. In this manner, the protruding portions of a selected number of retaining legs 14 can be removed so that the seal/retainer 10 can be customized to accommodate "side-clearance" or "zero-clearance" installations, and even legless applications. In the illustrated embodiment of the seal/retainer 10, each of its retaining legs 14 includes a break-off notch 18, whereby none, one, some, or all of the retaining legs 14 can be removed. That being said, a seal/retainer unit 10 with some or all of its retaining legs 14 being "notchless" is possible with and contemplated by the present invention.

Figure 8:
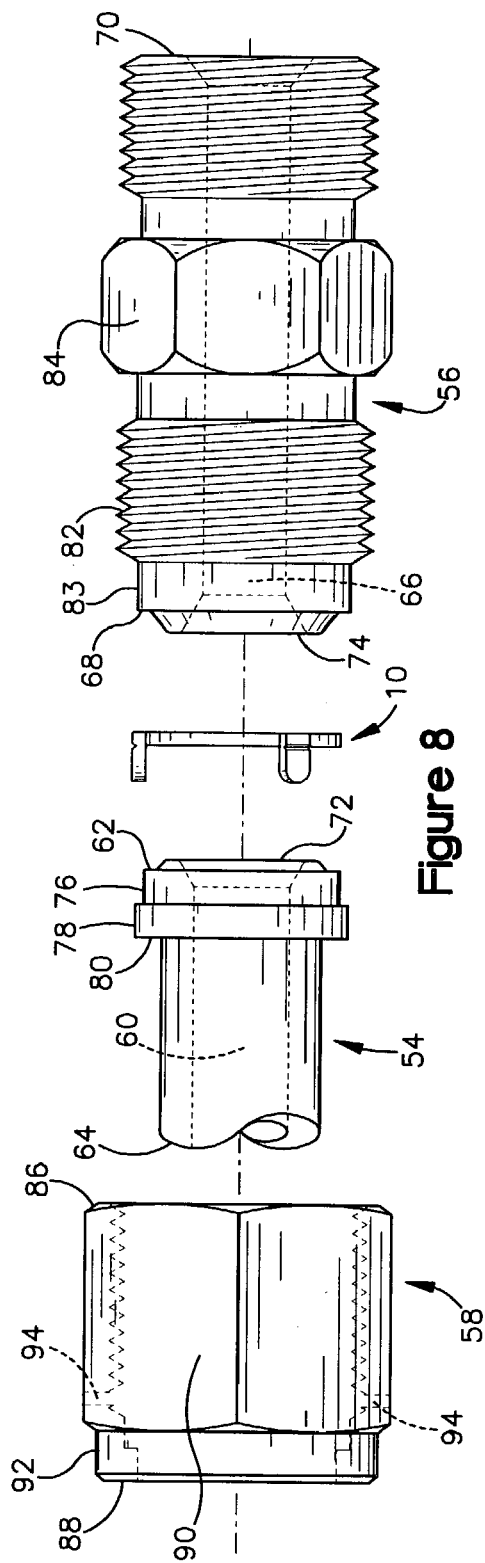
FIG. 8 is an exploded side elevational view of a fluid connection according to the present invention.
Figure 9:
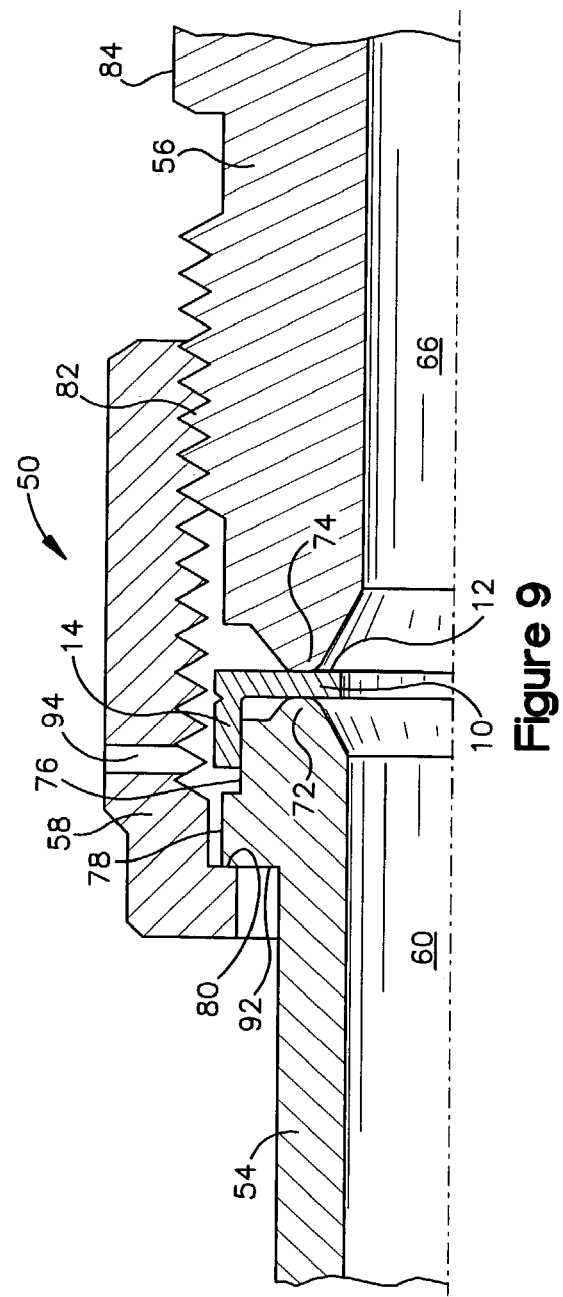
FIG. 9 is a cross-sectional view of the assembled fluid connection.

Referring now to FIGS. 8 and 9, a fluid connection 50 incorporating a seal/retainer 10 according to the present invention is shown. In addition to the seal/retainer 10, the illustrated fluid connection 50 comprises a first coupling component 54, a second coupling component 56, and a coupling nut 58. The seal/retainer 10 can be used in the fluid connection 50 (or another fluid connection) with all of its retaining legs 14 intact. Alternatively, one, a plurality, or all of its retaining legs 14 could be removed to accommodate side-loaded and zero-clearance situations.

The first coupling component 54 comprises a fluid passageway 60 extending longitudinally between its inner face 62 and its outer end 64. The second coupling component 56 comprises a fluid passageway 66 extending longitudinally between its inner face 68 and its outer end 70. In the assembled fluid connection 50, the inner faces 62 and 68 are disposed in an end-to-end relationship to provide a through-path between the passageways 60 and 66. The outer ends 64 and 70 are adapted for connection to first and second fluid lines or another associated structure.

A sealing bead 72 extends axially outward from the inner face 62 of the first coupling component 54, and a similar sealing bead 74 extends axially outward from the inner face 68 of the second coupling component 56. The sealing beads 72 and 74 are each coaxial with the passageway 60 and the passageway 66, respectively. On the first coupling component 54, a stepped radial flange, next to the inner face 62, forms a first circumferential ledge 76; a second, greater diameter, circumferential ledge 78; and an annular axial face 80. On the second coupling component 56, a threaded area 82 is positioned next to the inner face 68, a ledge 83 extends between the face 68 and the area 82, and a hexagonal-tool-receiving area 84 is positioned adjacent to the threaded area 82.

The coupling nut 58 comprises an open-ended structure having a forward end 86, a rear end 88, and an interior bore 90 extending therebetween. With the exception of a rearward portion, the bore 90 has a diameter greater than that of the ledge 78 of the first coupling component 54 and is adapted for threaded engagement with the threaded area 82 of the second coupling component 56. The rearward portion of the bore 90 has a smaller diameter, less than that of the ledge 78 of the first coupling component 54, thereby forming a shoulder 92. Test ports 94 can be provided as necessary or desired.

To assemble the fluid connection 50, the coupling components 54 and 56 are placed in an end-to-end relationship so that the sealing beads 72 and 74 are disposed in opposed relationship to each other. The seal/retainer unit 10 is interposed between the beads 72 and 74, and the first and second coupling components 54 and 56 are drawn together by the nut 18. Specifically, the nut 18 is slipped over the stepped flange (76, 78, 80) of the first coupling component 54 so that its interior threads engage the threaded area 82 of the second coupling component 56. One wrench may then be used to grasp the hexagonal-tool-receiving area 84 on the second coupling component 56 to stabilize it while another wrench is used to turn the nut 18. The abutting of the nut's shoulder 92 with the circumference ledge 78 of the first coupling component 54 will indicate proper engagement between the coupling components 54 and 56.

With particular reference to FIG. 9, the retainer/seal unit 10 is shown assembled in the fluid connection 50. The retainer/seal unit 10 is positioned between the inner faces 62 and 68 of the first and second coupling components 54 and 56. The sealing beads 72 and 74 press into the annular sealing gasket 12 and may make slight indentations thereon. The distal ends of the retaining legs 14 are positioned upon the ledge 76 of the first coupling component 54. It may be seen that the inner diameter $ID_{gasket}$ of the sealing gasket 12 is such that it extends radially past the beads 72 and 74 and into the flared ends of the fluid passageways 60 and 66. Also, the retaining legs' length $L_{leg}$ are such that they extend onto, but not beyond, the ledge 76.

Furthermore, the inner diameter $ID_{legs}$ defined by the retaining legs 14 is slightly less than the diameter of the ledge 76 of the first coupling component, whereby the retaining legs 14 are urged radially outward so that a biasing type of retaining force will be continuously exerted on the ledge 76. In this manner, the seal/retainer 10 can be clipped to the first coupling component 56 in an initial assembly step. Additionally or alternatively, the ledge 83 can be constructed to have the same diameter as the ledge 76 whereby the seal/retainer 10 can be instead be clipped to the second coupling component 56 in the initial assembly step.

As was indicated above, the dimensions of the integrated seal/retainer 10 are dictated by the geometry and strength/seal requirements of its intended use. For example (and by no means limitation), the following approximate dimensions can be used:

|  | $OD_{gasket}$ | $ID_{gasket}$ | $OD_{legs}$ | $ID_{legs}$ | $T_{gasket}/T_{leg}$ | $L_{leg}$ | $W_{leg}$ |
|---|---|---|---|---|---|---|---|
| ¼" | 0.425" | 0.220" | 0.485" | 0.430" | 0.030" | 0.140" | 0.060" |
| ½" | 0.715" | 0.435" | 0.775" | 0.720" | 0.030" | 0.140" | 0.060" |
| ¾" | 1.060" | 0.650" | 1.120" | 1.065" | 0.030" | 0.200" | 0.060" |
| 1" | 1.320" | 0.900" | 1.380" | 1.325" | 0.030" | 0.215" | 0.060" |

One may now appreciate that the present invention provides a seal/retainer unit 10 which can be mass-produced in an economic, commercially viable manner. The seal/retainer unit 10 can be stamped in an automatic stamping operation and a plurality of the seal/retainer units 10 can be nested in a stacked arrangement, with a gap G being provided between adjacent units to facilitate pre-annealing cleaning steps. The seal/retainer 10 can be constructed to minimize package tearing and inter-part marking, and/or to allow selective removal of one of more retaining legs 14.

Although the invention has been shown and described with respect to certain preferred embodiments, it is apparent that equivalent and obvious alterations and modifications will occur to others skilled in the art upon the reading and understanding of this specification. The present invention includes all such alterations and modifications and is limited only by the scope of the following claims.

The invention claimed is:

1. A seal/retainer unit comprising an annular sealing gasket and one or more retaining legs extending generally perpendicularly therefrom;
    wherein the sealing gasket and the retaining leg(s) are formed in one piece;
    wherein the sealing gasket has an inner diameter $ID_{gasket}$, an outer diameter $OD_{gasket}$, and a thickness $T_{gasket}$ defined by the distance between its upper axial surface and its bottom axial surface;
    wherein each retaining leg has a length $L_{leg}$, a width $W_{leg}$, and a thickness $T_{leg}$; and a distal edge which is an exposed edge of the seal/retainer unit;
    wherein radially outermost surfaces of the retaining leg(s) define an outer diameter $OD_{legs}$ and radially innermost surfaces of the retaining leg(s), including the distal edge(s), define an inner diameter $ID_{legs}$;
    wherein the inner diameter $ID_{legs}$ is not less than the outer diameter $OD_{gasket}$, whereby a plurality of the seal/retainer units can be nested in a stacked arrangement;
    wherein the intersection between the bottom axial surface of the gasket and the radially inner surface(s) of the retaining leg(s) is a corner; and
    wherein the gasket thickness $T_{gasket}$ is approximately equal to the leg thickness $T_{leg}$.

2. A seal/retainer unit as set forth in claim 1, wherein the outer diameter $OD_{gasket}$ is approximately equal to the outer diameter $OD_{legs}$ less twice the leg thickness $T_{leg}$.

3. A seal/retainer unit as set forth in claim 1, wherein the one or more retaining legs comprises a plurality of retaining legs.

4. A seal/retainer unit as set forth in claim 3, wherein the plurality of retaining legs are uniformly arranged about the outer diameter $OD_{gasket}$ of the sealing gasket.

5. A seal/retainer unit as set forth in claim 3, wherein the plurality of retaining legs comprises three retaining legs.

6. A seal/retainer unit as set forth in claim 1, wherein the annular sealing gasket and the retaining leg(s) are made from a sealing material.

7. A seal/retainer unit as set forth in claim 6, wherein the sealing material is a sealing metal.

8. A seal/retainer unit as set forth in claim 7, wherein the sealing metal is nickel, steel, or copper.

9. A seal/retainer unit as set forth in claim 1, wherein the distal edge of each retaining leg is rounded.

10. A seal/retainer unit as set forth in claim 1, wherein at least one retaining leg includes a break-off notch extending across its width $W_{leg}$, whereby the retaining leg can be selectively removed from the annular sealing gasket.

11. A plurality of the seal/retainer units set forth in claim 1 nested in a stacked arrangement.

12. A plurality of the seal/retainer units as set forth in claim 11, wherein there is a gap G between the adjacent gaskets.

13. A plurality of the seal/retainer units as set forth in claim 11, wherein the retaining legs of adjacent units are angularly rotated relative to each other.

14. A seal/retainer unit as set forth in claim 1, wherein the corner between the bottom axial surface of the gasket and the radially inner surface(s) of the retaining leg(s) is a radiused corner.

15. A plurality of the seal/retainer units set forth in claim 14 nested in a stacked arrangement, wherein the radiused corner provides a gap G between adjacent gaskets.

16. A seal/retainer unit as set forth in claim 1 wherein the annular sealing gasket and the retaining leg(s) are formed from a blank comprising an annular portion and one or more leg portions extending radially outward therefrom.

17. A method of forming the seal/retainer unit set forth in claim 1 in one piece, said method comprising the steps of:
    stamping a blank comprising an annular portion and one or more leg portions extending radially outward from the annular portion; and
    bending the leg portions generally perpendicularly relative to the annular portion to form the annular sealing gasket and the retaining leg(s);
    wherein the stamping and/or bending steps are performed in such a manner that the inner diameter $ID_{legs}$ is not less than the outer diameter $OD_{gasket}$.

18. A method as set forth in claim 17, wherein the stamping step comprises stamping the blank from a flat sheet of sealing material having a thickness equal to the desired thickness $T_{gasket}$ of the annular sealing gasket.

19. A method as set forth in claim 18, wherein said stamping step comprises forming a break-off notch on at least one leg portion.

20. A method as set forth in claim 18, wherein said bending step results in a rounded intersection between the annular portion and the leg portions, thereby forming an angled corner.

21. A method as set forth in claim 20, further comprising the step of nesting a plurality of the parts in a stacked arrangement and wherein the angled corners assure a gap G between adjacent units.

22. A method as set of forth in claim 17, wherein the stamping step comprises forming a plurality of blanks with an automatic stamping operation.

23. A method as set forth in claim 22, wherein the bending step is performed during the same automatic operation.

24. A method as set forth in claim 23, further comprising the steps of cleaning the units and annealing the units after the bending step.

25. A method as set forth in claim 24, wherein a plurality of the units are nested in a stacked arrangement for the cleaning step.

26. A method as set forth in claim 25, further comprising the step of ultra-cleaning the units after said annealing step.

27. A method as set forth in claim 25, wherein the units are nested in a stacked arrangement with a gap G between adjacent units.

28. A method as set forth in claim 24, further comprising the step of polishing the units after said annealing step.

29. A method as set forth in claim 24, further comprising the step of packaging the units after said annealing step.

30. A fluid connection including a first coupling component, a second coupling component, and the seal/retainer set forth in claim 1; wherein the seal/retainer unit is interposed between inner faces of the first and second coupling components.

31. A fluid connection as set forth in claim 30, wherein the first and second coupling components each have axially protruding sealing beads which press into the sealing gasket.

32. A fluid connection as set forth in claim 30, wherein the distal end of each retaining leg is positioned upon a ledge of one of the first or second coupling component.

33. A fluid connection as set forth in claim 32, wherein the inner diameter $ID_{gasket}$ of the sealing gasket extends radially past the sealing beads and into a union between fluid passageways of the first and second coupling components.

34. A fluid connection as set forth in claim 32, wherein the inner diameter $ID_{legs}$ defined by the retaining legs is the same or slightly less than the diameter of the ledge, whereby the retaining legs are urged radially outward so that a biasing-type of retaining force will be continuously exerted on the ledge.

35. A fluid connection as set forth in claim 30, further comprising a nut used to draw together the first and second coupling components during assembly of the fluid connection.

36. A seal/retainer comprising an annular sealing gasket and one or more retaining legs extending generally perpendicularly therefrom; wherein:
the sealing gasket and the retaining leg(s) are formed in one piece;
the sealing gasket has an inner diameter $ID_{gasket}$, an outer diameter $OD_{gasket}$, and a thickness $T_{gasket}$;
each retaining leg has a length $L_{leg}$, a width $W_{leg}$, and a thickness $T_{leg}$; and a distal edge which is an exposed edge of the seal/retainer unit;
radially outermost surfaces of the retaining leg(s) define an outer diameter $OD_{legs}$ and radially innermost surfaces of the retaining leg(s), including the distal edge (s), define an inner diameter $ID_{legs}$;
the inner diameter $ID_{legs}$ is not less than the outer diameter $OD_{gasket}$, whereby a plurality of the seal/retainer units can be nested in a stacked arrangement;
the gasket thickness $T_{gasket}$ is approximately equal to the leg thickness $T_{leg}$;
the one or more retaining legs comprises a plurality of retaining legs;
the sealing gasket and the retaining legs are made from nickel, steel, or copper;
each retaining leg is provided with a rounded distal edge; and
the intersection between the bottom axial surface of the gasket and the radially inner surface(s) of the retaining leg(s) is a radiused corner.

37. A seal/retainer unit as set forth in claim 36, wherein at least one retaining leg includes a break-off notch extending across its width $W_{leg}$, whereby the retaining leg can be selectively removed from the annular sealing gasket.

38. A seal/retainer unit comprising an annular sealing gasket and one or more retaining legs extending generally perpendicularly therefrom;
wherein the annular sealing gasket and the retaining leg(s) are formed in one piece;
wherein the annular sealing gasket has an inner diameter $ID_{gasket}$, an outer diameter $OD_{gasket}$, and a thickness $T_{gasket}$;
wherein each retaining leg has a length $L_{leg}$, a width $W_{leg}$, and a thickness $T_{leg}$;
wherein radially outermost surfaces of the retaining leg(s) define an outer diameter $OD_{legs}$ and radially innermost surfaces of the retaining leg(s) define an inner diameter $ID_{legs}$;
wherein each retaining leg has a break-off notch extending across its width $W_{leg}$ for selective removal of the portion of the leg below the break-off notch.

39. A seal/retainer unit as set forth in claim 38, wherein the break-off notch extends radially inward from the outer surface of the retaining leg.

40. A seal/retainer unit as set forth in claim 39, wherein the break-off notch is axially aligned with or above the lower surface of the sealing gasket.

41. A seal/retainer unit as set forth in claim 40, wherein the break-off notch extends radially inward from the outer surface of the retaining leg.

42. A seal/retainer unit as set forth in claim 38, wherein the one or more retaining legs comprises a plurality of retaining legs and wherein some of the plurality of retaining legs include a break-off notch extending across the width $W_{leg}$ of the retaining leg.

43. A seal/retainer unit as set forth in claim 42, wherein each break-off notch is axially aligned with, just below, or above the lower surface of the sealing gasket.

44. A seal/retainer unit as set forth in claim 38, wherein the one or more retaining legs comprises a plurality of retaining legs and wherein all of the plurality of retaining legs include a break-off notch extending across the width $W_{leg}$ of the retaining leg.

45. A seal/retainer unit as set forth in claim 44, wherein each break-off notch is axially aligned with, just below, or above the lower surface of the sealing gasket.

46. A seal/retainer unit as set forth in claim 38, wherein the portion of the leg below the break-off notch has been removed for at least one retaining leg.

47. A fluid connection including a first coupling component, a second coupling component, and the seal/retainer set forth in claim 46, wherein the seal/retainer unit is interposed between inner faces of the first and second coupling components.

48. A seal/retainer unit as set forth in claim 38, wherein the one or more legs comprises a plurality of retaining legs and wherein the portion of the leg below the break-off notch has been removed from some of the retaining legs.

49. A fluid connection including a first coupling component, a second coupling component, and the seal/retainer set forth in claim 48, wherein the seal/retainer unit is interposed between inner faces of the first and second coupling components.

50. A seal/retainer unit as set forth in claim 38, wherein the one or more legs comprises a plurality of retaining legs and wherein the portion of the leg below the break-off notch has been removed from all of the retaining legs.

51. A fluid connection including a first coupling component, a second coupling component, and the seal/retainer set forth in claim 50, wherein the seal/retainer unit is interposed between inner faces of the first and second coupling components.

52. A seal/retainer unit as set forth in claim 38, wherein the annular sealing gasket and the retaining leg(s) are formed from a blank comprising an annular portion, one or more leg portions extending radially outward therefrom, and a break-off notch extending across the width of each leg portion.

53. A method of forming the seal/retainer unit set forth in claim 38 in one piece, said method comprising the steps of:
stamping a blank comprising an annular portion and one or more leg portions extending radially outward from the annular portion;
forming a break-off notch on at least one leg portion; and
bending the leg portions generally perpendicularly relative to the annular portion to form the annular sealing gasket and the retaining leg(s).

54. A method as set forth in claim 53, wherein the stamping step and the notch-forming step are performed substantially simultaneously.

* * * * *